(No Model.) 3 Sheets—Sheet 1.
A. ADAMSON.
APPARATUS FOR TEACHING MUSIC.
No. 451,010. Patented Apr. 28, 1891.
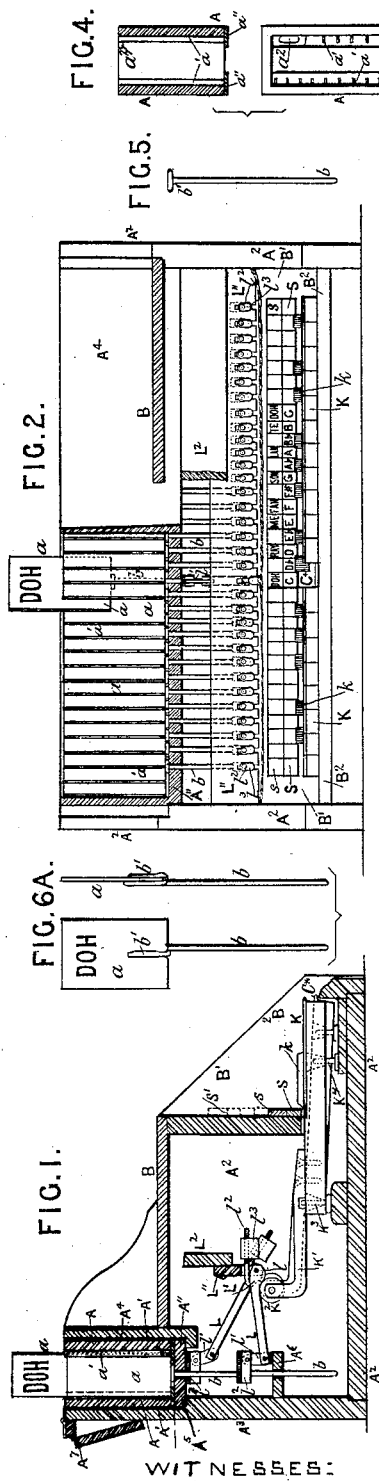
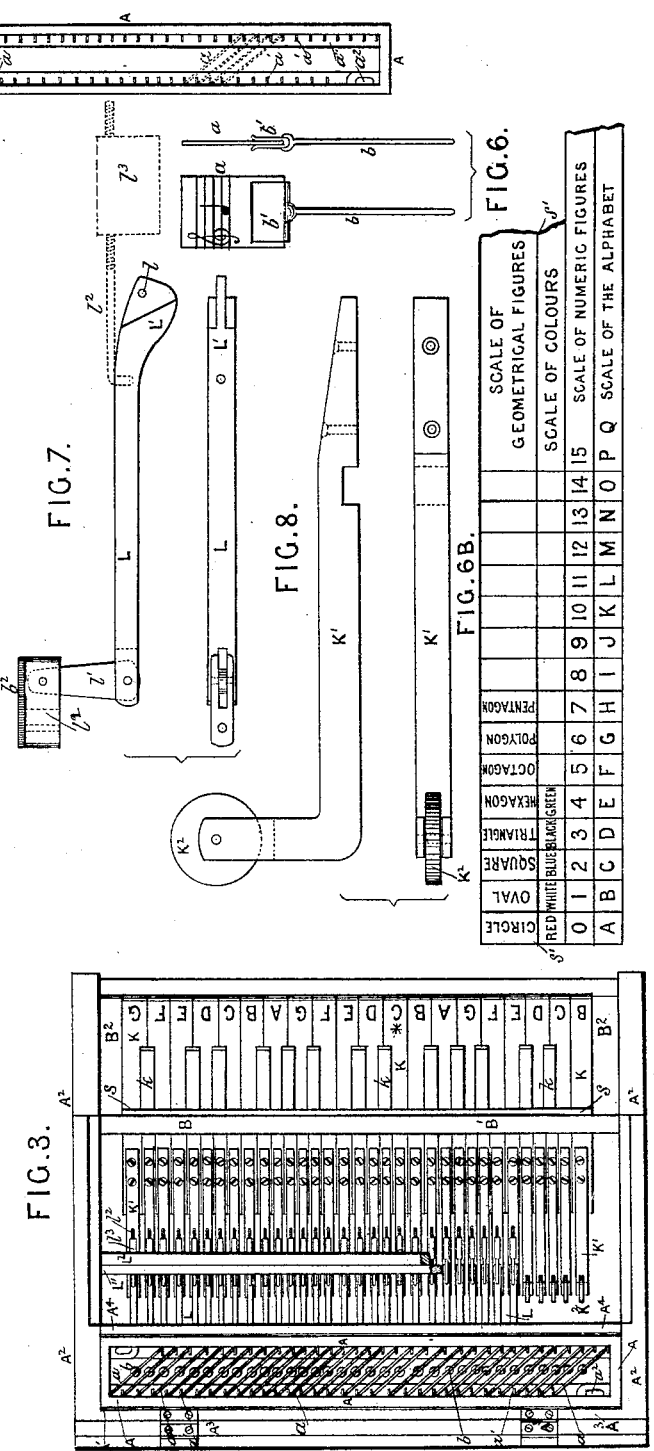
WITNESSES:
E. B. Bolton
H. de Vos
INVENTOR:
Alexander Adamson
By Richards &c.
his Attorneys.

(No Model.) 3 Sheets—Sheet 2.
A. ADAMSON.
APPARATUS FOR TEACHING MUSIC.
No. 451,010. Patented Apr. 28, 1891.
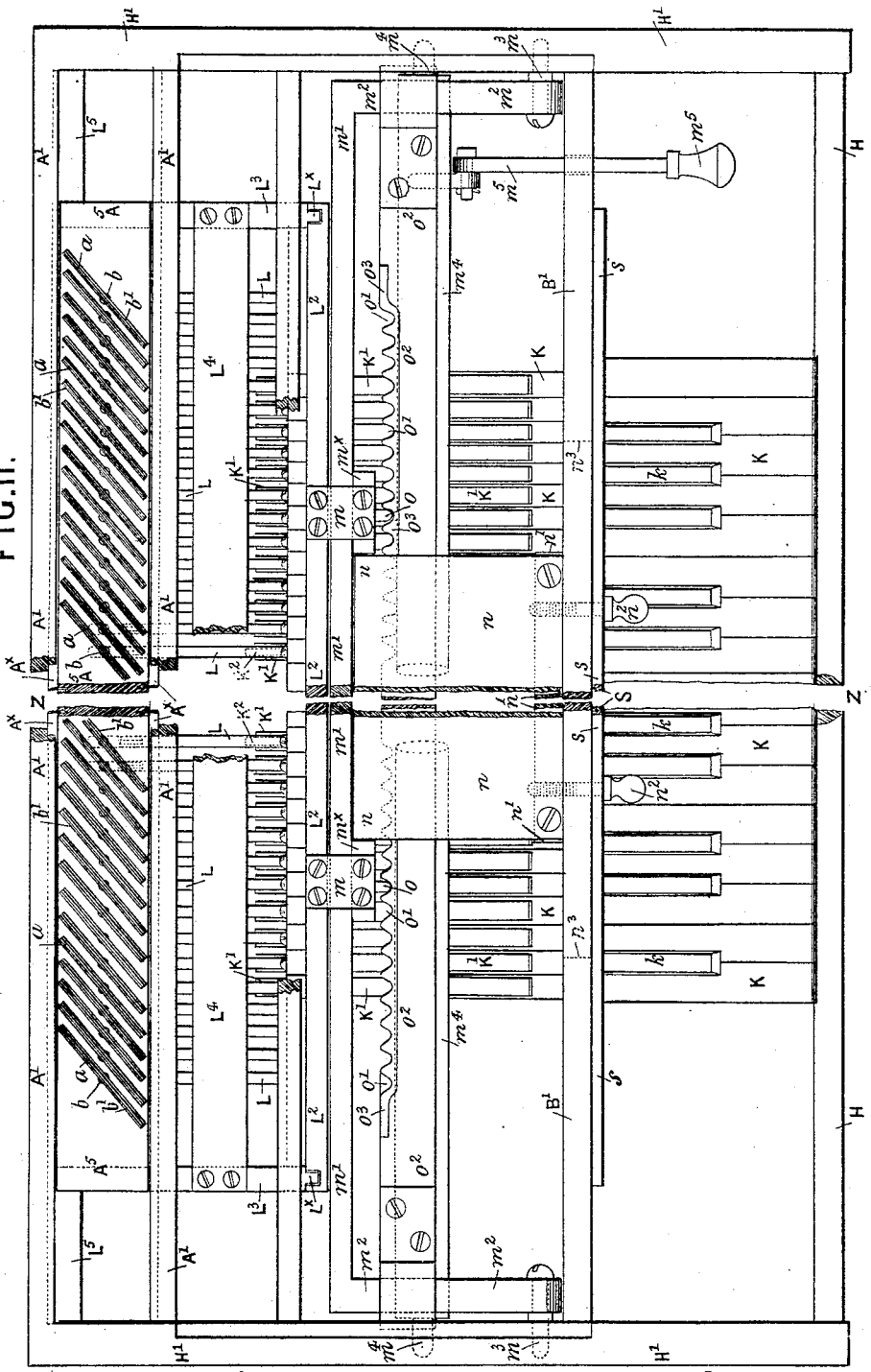

(No Model.) 3 Sheets—Sheet 3.

A. ADAMSON.
APPARATUS FOR TEACHING MUSIC.

No. 451,010. Patented Apr. 28, 1891.

UNITED STATES PATENT OFFICE.

ALEXANDER ADAMSON, OF DUNDEE, SCOTLAND.

APPARATUS FOR TEACHING MUSIC.

SPECIFICATION forming part of Letters Patent No. 451,010, dated April 28, 1891.

Application filed October 30, 1889. Serial No. 328,734. (No model.) Patented in England October 8, 1887, No. 13,626.

*To all whom it may concern:*

Be it known that I, ALEXANDER ADAMSON, teacher of music, a subject of the Queen of Great Britain and Ireland, residing at 79 Commercial street, Dundee, in the county of Forfar, Scotland, have invented Apparatus for the Teaching of Music and other Branches of Education by Signs, (for which I have obtained a patent in Great Britain, dated October 8, 1887, No. 13,626,) of which the following is a specification.

This invention has reference to and comprises new or improved modes and means or combinations of appliances for the teaching of music simultaneously, sounding the notes of the music or words by the voice or the harmonium or instrument to which the apparatus is applied, or teaching other branches of education by signs and sounding the words at the same time to associate the signs and the sounds in the pupil's mind; and in order to enable others skilled in the art to which my invention relates to understand how it may be carried into effect or practice, I have hereunto appended three explanatory sheets of drawings, in which the same reference-letters are used to indicate like or corresponding parts in all the figures where shown.

Figure 9:
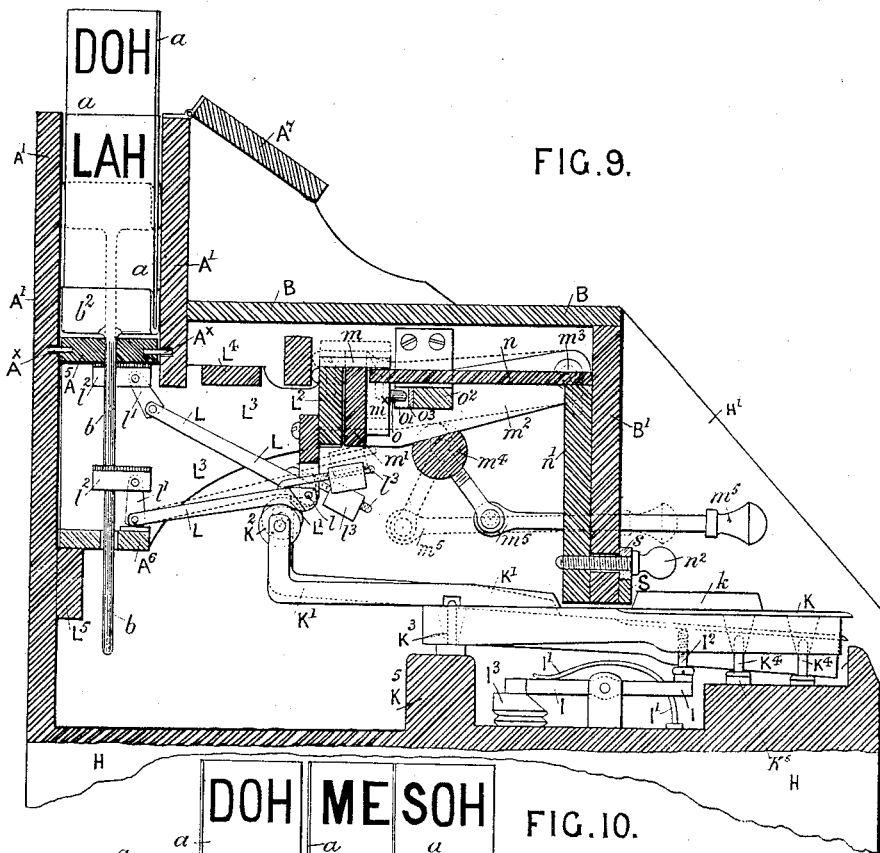
Figure 10:
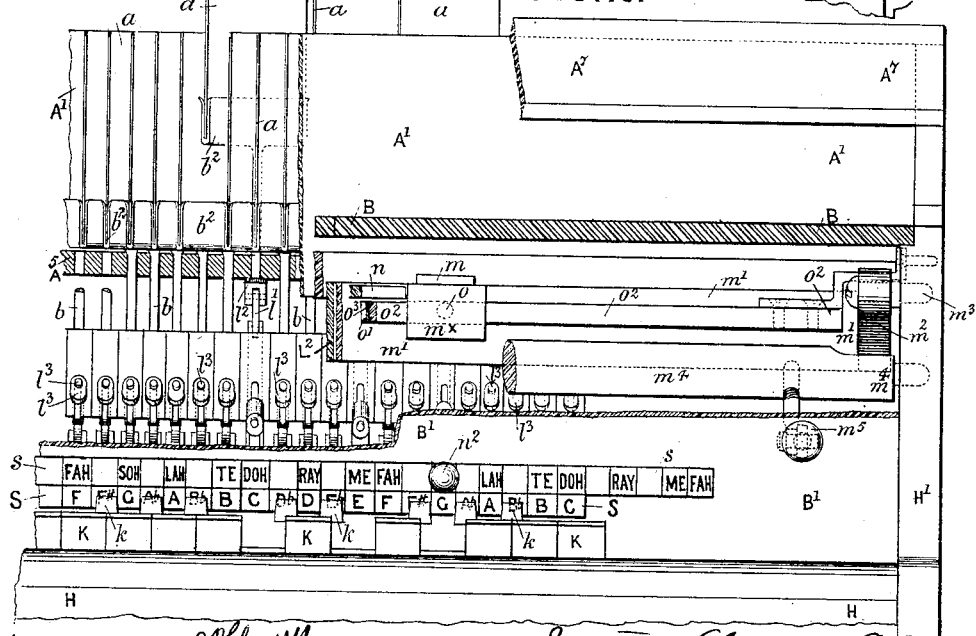

Figure 1 on Sheet 1 is a transverse vertical section of a simple portable construction of my new or improved instrument or teacher's symbolic auxiliary in a portable form for teaching music or other branches of education, and Figs. 2 and 3 are respectively a front elevation and plan of the same instrument corresponding to Fig. 1, both partly in section to show the details of construction and action more clearly, while Figs. 4 to 8 are detached views of details to a large scale. Fig. $6^b$ shows a few extra scales for teaching other subjects as well as the musical scales S s shown over the keys in Figs. 1 to 3. Figs. 9 and 10 on Sheet 2 are a transverse vertical section and a partial front elevation, respectively, of my improvements or teacher's symbolic auxiliary as applied to a harmonium, and Fig. 11 on Sheet 3 is a sectional plan of the application shown in Fig. 9, with the center portion broken away at Z Z.

Referring to Figs. 1 to 8 on Sheet 1 of these drawings, in this arrangement a card-box A, (shown in detached section and plan, Fig. 4,) with its equally-divided vertical guides and slots $a'$ for containing and guiding the cards $a$, is made long and portable to suit a recess or chamber in the top back part of the outer inclosed case $A' A^2$, and open above and below and having the cards $a$ with the signs of the notes on them arranged equally distant in octaves and resting on bottom ledges $a^2$ at the sides below the vertical guides $a'$, so that the cards can be raised by a button $b'$ at the top of the raising spindles $b$, (shown detached in Fig. 5,) and working freely over the guide-bottom $A^5$ of the chamber $A' A'$ at the top of the main frame $A^3 A^4$. The spindles $b$ are fitted to work up through the fixed guide-bars $A^5 A^6$ in a single row or rank, each exactly under the center of the cards $a$ and in line with and over the back of a set of finger-keys K $k$, analogous to those of a harmonium, and shown in Figs. 2 and 3, of rather more than two and a half octaves, suitable for teaching within the compass of the ordinary voice for, say, about an octave below and an octave and half above the mid C natural, as indicated at $C^*$ and by letters on the front finger ends of, say, twenty white keys K in Fig. 3, and thirteen half-tone black keys $k$, which raise and actuate, as hereinafter described, thirty-three cards $a$ in the box A. The keys K $k$ oscillate on their center fulcrum-pins, as dotted in at $K^3$, and are steadied on guide-pins $K^4$ on a bar $K^5$. Each lever K $k$ is fitted with an upper back lever $K'$, with an anti-friction roller $K^2$ on its upper back end, (shown detached in elevation and plan in Fig. 8,) and a second lever L (shown detached in elevation and plan, Fig. 7) is mounted over the roller $K^2$ of each lever $K'$ by a fulcrum-pin at $l$ at one end in brackets fixed to the longitudinal rail $L^2$ of the end frames $A^2$ of the box; but it might be a movable rail, as hereinafter described. The rear end of each lever L is connected by a link $l'$ to a moving block $l^2$, secured by stiff friction; but it might be by a pinching-screw to the spindle $b$ opposite and passing through it, so as to lift this and the card $a$ over it corresponding to each key K $k$ of the key-board by the depression of each key by its levers K $K'$ or $k$ $K'$ and roller $K^2$, the latter acting on a projecting curved part $L'$ of the lever L in front of the fulcrum $l$. Each lever L is fitted in front of the fulcrum $l$ with a screw-spindle and weight $l^3$ to nearly counterbalance the weight of the lever L and the weight of the card and spindle $a\,b$ which it actuates, the weight $l^3$ being made adjustable on its screw-spindle, as indicated in dotted lines in the large view Fig. 7, the under head $b'$ of the spindle $b$ and the blocks $l^2$ and guide-rails $A^6$ being fitted with strips of felt or chamois leather to act as a cushion and lessen the sound of the action of these parts in their up and down motion, and all inclosed within the upper and front boards B B', secured to the ends $A^2$ of the case $A^3$ $A^4$ and having the scales S and $s$ of the ordinary staff and the tonic sol-fa notations, respectively, secured on the front board B', close over the keys K $k$, as seen more particularly in Fig. 2. In Figs. 1 and 2 the mid-key C natural (marked C*) is shown depressed and its lever L and spindle $b$ and card $a$ as raised.

Referring to Figs. 9 to 11 on Sheets 2 and 3, which show my new appliances described in Figs. 1 to 8 as applied to the upper part of a harmonium H, the raising-rods $b$ and levers L K' for raising the cards $a$ are made and connected substantially like those shown and described in reference to the portable arrangement, Figs. 1 to 8, and the parts lettered to correspond, so that they will not require special reference except in so far as the essential differences adopted in adapting the application of my said improvements to a harmonium H so as to be worked by the keys K $k$ thereof at will, as desired. The keys K $k$ of the harmonium are mounted, as usual, on their back fulcrum-pins $K^3$ on the top of a rail $K^5$, steadied on their front guide-pins $K^4$ all over their reed-box levers I, each with a closing pallet-blade or wire-spring lever I', with a valve $I^3$ on one end of the lever I, while the other end raises the keys K $k$ to their level position through a regulating-screw $I^2$ on the under side of each key ready for being actuated and depressed by the fingers, all so far in an ordinary manner. In this arrangement the back lever K' is secured to each key K $k$ of the harmonium H and acts on the supplementary lever L L', all as before described in reference to Figs. 1 to 8; but in this case the whole row of levers L have their fulcrumed carrying-brackets screwed to the back bar $L^2$, sliding vertically on the end brackets $L^3$, which carry the guide-frames $A^5$ $A^6$ of the spindles $b$ and secured as a longitudinal moving frame by the bar $L^4$ to slide longitudinally on the back fixed bar $L^5$, the spindles $b$ in this case having spring-plate clips $b^2$ at their upper part for gripping, holding, and carrying the cards $a$, like the finger and thumb, without a separate portable box A, and shown in side and edge views in different forms in Figs. 6 and $6^a$ on Sheet 1, Fig. $6^a$ being made out of wire with a prong in its upper end to pass through the card, the upper guide-board $A^5$ in this case working by feathers in slide-grooves in the inner surfaces of the top of the inclosing chamber A' A', all so that the frame $L^3$ $L^4$ and guide-rails $A^5$ $A^6$, carrying the spindles $b$ and levers L, can be shifted longitudinally and the rail $L^2$ shifted vertically by feathers and grooves at $L^\times$, Fig. 11, on the ends of the brackets $L^2$ $L^3$ to raise the fulcrum ends of the whole set of levers L out of action with the levers K', all as will hereinafter be described. The vertical lifting-rail $L^2$ is secured by plates and screws $m$ to blocks $m^\times$ on opposite sides of the center of the instrument to the right and left over the top of a vertical reciprocating lifting-rail $m'$, secured on the free end of levers $m^2$, fulcrumed at $m^3$ on the inner sides of the ends H' of the harmonium H, these levers resting on flat parts of an oscillating bar $m^4$, also fulcrumed in the end frames H' and actuated by a hand-spindle $m^5$ in front, either to raise or lower the levers $m^2$ and rail $m'$ and bar $L^2$ with the whole set of levers L out of or into working position over the levers and their rollers R' $R^2$, by the pushing in or drawing out of the handle $m^5$, and as indicated in dotted and sharp lines in Fig. 9. The frame $L^3$ $L^4$, carrying the cards $a$ and their guide-rails $A^5$ $A^6$, and the levers L are also shifted laterally by the short horizontal and vertical frame $n\,n'$, secured together within the upper and front frames B B' of the harmonium H over the keys and mounted between the blocks $m^\times$ over a fixed longitudinal rail $o^2$, and by two hand-screw pins $n^2$ working out through slotted guides at $n^3$ in the front rail B' of the harmonium H, just over the keys. The hand-screws $n^2$ also secure the shifting tonic sol-fa scale $s$ over the fixed alphabetical scale S, indicating the staff notation above the keys, as shown in Fig. 10, all so as to shift the former over the latter by the handles $n^2$ to any key or scale to the right or left by sight in front on the accurate divisions on both scales over the keys, so that the levers L and their respective cards $a$ may be accurately set longitudinally over the back levers K' of the front finger-keys K $k$ to raise and indicate the notes on or to the desired scale on moving the finger-keys, or raise these levers L entirely out of action from the levers K' when it is desired to play on the harmonium to sound the keys K $k$ without raising the indicating-cards $a$. This determining of the exact position of the levers L and cards $a$ is also secured to prevent shifting and give complete accuracy by a lateral pin $o$, projecting out in front of each block $m^\times$, taking into accurately-divided notches $o'$ (agreeing to the distance between the keys K $k$ and their back levers K') in the brass plate $o^3$, screwed in the side of the fixed bar $o^2$, opposite each block $m^\times$, so that on this block $m^\times$ and its bar $m'$ being lowered by the handle $m^5$ the pin $o$ takes into the proper notch $o'$ and retains it there until raised by the handle $m^5$ again, when it and the whole of the levers L may be shifted laterally back to the C natural or any other key and lowered, as before described and as seen more particularly in the plan view, Fig. 11. Although the lateral sliding frame $n\,n'$ has been shown as shifting the back frame $l^3\ l^4$, carrying the levers L by the blocks $m^\times$ and vertical shifting rail $L^2$, yet this might be done in other ways by a direct connection to the frame $L^3\ L^4$, and the frames $L^3\ L^4\ A^5\ A^6$, although shown as guided by feather and groove fittings at $A^\times\ L^\times$ in the bottom of the case $A'$, carrying the cards $a$, may be mounted on anti-friction rollers in the lower guide-bar $L^5$. The inclosing box part $A'\ A'$ would preferably be fitted with a double or single hinged lid, as indicated at $A^7$ in Figs. 1 and 9, respectively, for closing in the sets of cards $a$ and protecting them from dust when not in use.

What I claim is—

1. An instrument for teaching music and the like, comprising the combination of cards or tickets $a$ with the musical or other teaching signs on them ranged angularly and raised by vertical spindles $b$ in a single row or rank through levers L, each actuated by corresponding levers $K'$ under them, secured on the back end of the keys K $k$ of a key-board musical instrument or equivalently-arranged hand key-board instrument, substantially as and for the purposes set forth.

2. In an instrument for teaching music and other teaching purposes, whether portable or mounted over the key-board and keys of a musical instrument, the combination of a movable frame $A^5\ A^6\ L^2\ L^3\ L^4\ m\ m'$, carrying the cards $a$ and vertical spindles $b$ and their actuating-levers L, shifted over the actuating key-levers of the key-board by a sliding frame $n\ n'$ and handles $n^2$ in front, substantially as and for the purposes set forth.

3. In an instrument for teaching music and the like, the combination, with the moving frame of cards and actuating-levers L therefor, of locking mechanism for retaining said frame and levers, substantially as set forth.

4. In a key-board instrument for teaching music and other teaching purposes, having the keys ranged as in a piano or harmonium, the combination of a removable box A for containing a set of cards $a$ for the respective subjects being symbolically taught, ranged at an angle, so that each card $a$ is actuated by a corresponding key of the instrument, substantially as herein set forth.

In witness whereof I have hereunto set my hand in presence of two witnesses.

ALEXR. ADAMSON.

Witnesses:
R. C. THOMSON,
THOS. S. DUFFIE.